(12) United States Patent
Wang et al.

(10) Patent No.: US 9,986,173 B2
(45) Date of Patent: May 29, 2018

(54) SURROUND-VIEW CAMERA SYSTEM (VPM) ONLINE CALIBRATION

(71) Applicant: GM GLOBAL TECHNOLOGY OPERATIONS LLC, Detroit, MI (US)

(72) Inventors: Jinsong Wang, Troy, MI (US); Wende Zhang, Troy, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 249 days.

(21) Appl. No.: 14/710,289

(22) Filed: May 12, 2015

(65) Prior Publication Data

US 2015/0329048 A1    Nov. 19, 2015

Related U.S. Application Data

(60) Provisional application No. 61/994,649, filed on May 16, 2014.

(51) Int. Cl.
*B60R 1/00*    (2006.01)
*G06T 7/00*    (2017.01)
(Continued)

(52) U.S. Cl.
CPC .............. *H04N 5/247* (2013.01); *B60R 1/00* (2013.01); *G06T 7/80* (2017.01); *G06T 7/85* (2017.01);
(Continued)

(58) Field of Classification Search
CPC ........ H04N 5/247; H04N 17/002; G06T 7/80; G06T 7/85; G06T 2207/30261;
(Continued)

(56) References Cited

U.S. PATENT DOCUMENTS 9,536,306 B2    1/2017  Natroshvili et al.
2012/0287232 A1    11/2012  Natroshvili et al.
(Continued)

FOREIGN PATENT DOCUMENTS

CN    101763640 A    6/2010

OTHER PUBLICATIONS

Rublee, Ethan et al. "ORB: An Efficient Alternative to SIFT or SURF" USA, 8 pgs.
(Continued)

*Primary Examiner* — Christopher S Kelley
*Assistant Examiner* — Nasim Nirjhar
(74) *Attorney, Agent, or Firm* — John A. Miller; Shumaker, Loop & Kendrick, LLP

(57) ABSTRACT

A system and method for providing online calibration of a plurality of cameras in a surround-view camera system on a vehicle. The method provides consecutive images from each of the cameras in the surround-view system and identifies overlap image areas for adjacent cameras. The method identifies matching feature points in the overlap areas of the images and estimates camera parameters in world coordinates for each of the cameras. The method then estimates a vehicle pose of the vehicle in world coordinates and calculates the camera parameters in vehicle coordinates using the estimated camera parameters in the world coordinates and the estimated vehicle pose to provide the calibration.

18 Claims, 4 Drawing Sheets

(51) Int. Cl.
*H04N 17/00* (2006.01)
*H04N 5/247* (2006.01)
*G06T 7/80* (2017.01)

(52) U.S. Cl.
CPC ...... *H04N 17/002* (2013.01); *B60R 2300/102* (2013.01); *B60R 2300/105* (2013.01); *B60R 2300/303* (2013.01); *G06T 2207/10021* (2013.01); *G06T 2207/30261* (2013.01); *G06T 2207/30264* (2013.01)

(58) Field of Classification Search
CPC . G06T 2207/10021; G06T 2207/30264; B60R 1/00; B60R 2300/105; B60R 2300/303; B60R 2300/102
See application file for complete search history.

(56) References Cited

U.S. PATENT DOCUMENTS

| | | | | |
|---|---|---|---|---|
| 2012/0320209 | A1* | 12/2012 | Vico | B60R 1/00 348/148 |
| 2013/0293717 | A1 | 11/2013 | Zhang et al. | |
| 2015/0049193 | A1* | 2/2015 | Gupta | G03B 43/00 348/148 |
| 2015/0294161 | A1* | 10/2015 | Schamp | B60K 31/00 701/37 |
| 2016/0343136 | A1* | 11/2016 | Heidi | G06T 7/80 |

OTHER PUBLICATIONS

Zeng, Shuqing et al. Utility U.S. Appl. No. 14/283,518, filed May 21, 2014, entitled, "Automatic Calibration of Extrinsic and Intrinsic Amera Parameters for Surround-View Camera System".

* cited by examiner

SURROUND-VIEW CAMERA SYSTEM (VPM) ONLINE CALIBRATION

CROSS-REFERENCE TO RELATED APPLICATIONS

This application claims the benefit of the priority date of U.S. Provisional Patent Application Ser. No. 61/994,649, titled, Surround-View Camera System (VPM) Online Calibration, filed May 16, 2014.

BACKGROUND OF THE INVENTION

Field of the Invention

This invention relates generally to a system and method for calibrating the cameras in a surround-view camera system on a vehicle and, more particularly, to a system and method for providing online calibration of the cameras in a surround-view camera system on a vehicle.

Discussion of the Related Art

Modern vehicles generally include one or more cameras that provide back-up assistance, take images of the vehicle driver to determine driver drowsiness or attentiveness, provide images of the road as the vehicle is traveling for collision avoidance purposes, provide structure recognition, such as roadway signs, etc. Other vehicle vision applications include vehicle lane sensing systems to sense the vehicle travel lane and drive the vehicle in the lane-center. Many of these known lane sensing systems detect lane-markers on the road for various applications, such as lane departure warning (LDW), lane keeping (LK), lane centering (LC), etc., and have typically employed a single camera, either at the front or rear of the vehicle, to provide the images that are used to detect the lane-markers.

It has been proposed in the art to provide a surround-view camera system on a vehicle that includes a front camera, a rear camera and left and right side cameras, where the camera system generates a top-down view of the vehicle and surrounding areas using the images from the cameras, and where the images overlap each other at the corners of the vehicle. The top-down view can be displayed for the vehicle driver to see what is surrounding the vehicle for back-up, parking, etc. Future vehicles may not employ rearview mirrors, but may instead include digital images provided by the surround view cameras.

U.S. Patent Application Publication No. 2013/0293717 to Zhang et al., filed Apr. 9, 2013, titled, Full Speed Lane Sensing With A Surrounding View System, assigned to the assignee of this application and herein incorporated by reference, discloses a system and method for providing lane sensing on a vehicle by detecting roadway lane-markers, where the system employs a surround-view camera system providing a top-down view image around the vehicle. The method includes detecting left-side and right-side lane boundary lines in the top-down view image, and then determining whether the lane boundary lines in the image are aligned from one image frame to a next image frame and are aligned from image to image in the top-down view image.

For many camera-based vehicle applications it is critical to accurately calibrate the position and orientation of the camera with respect to the vehicle. Camera calibration generally refers to estimating a number of camera parameters including both intrinsic and extrinsic parameters, where the intrinsic parameters include focal length, optical center, radial distortion parameters, etc., and the extrinsic parameters include camera location, camera orientation, etc. Camera extrinsic parameters calibration typically involves determining a set of parameters that relate camera image coordinates to vehicle coordinates and vice versa. Some camera parameters, such as camera focal length, optical center, etc., are stable, while other parameters, such as camera orientation and position, are not. For example, the height of the camera depends on the load of the vehicle, which will change from time to time.

In the known surround-view camera systems, the images from the cameras overlap at the corners of the vehicle, where the camera calibration process "stitches" the adjacent images together so that common elements in the separate images directly overlap with each other to provide the desired top-down view. During manufacture of the vehicle, these camera images are stitched together to provide this image using any of a number of calibration techniques so that when the vehicle is first put into service, the cameras are properly calibrated. One calibration technique employed is to position the vehicle on a checker-board pattern of alternating light and dark squares where each point of the squares is suitably identified. Using these points in the developed images allows the camera calibration software to correct the position of the images so that overlapping points in adjacent images are identified at the same location.

However, once the vehicle is put into service various things may occur that could cause the orientation and position of the cameras to change, where the calibration of the camera includes errors causing misalignment in the top-down image. These things may include loading of the vehicle that causes camera position, such as height, and/or camera orientation, such as pitch, to change relative to world coordinates, small impacts to the vehicle which may change the position and orientation of the cameras, etc. However, current video processing modules (VPM) that process the images from the cameras to generate the top-down view are unable to recalibrate the cameras online while the vehicle is in use. Contrary, the vehicle operator must take the vehicle to a dealer or other authorized service center that has the ability to recalibrate the cameras in the same manner as was done during vehicle manufacture, which has obvious drawbacks.

SUMMARY OF THE INVENTION

The present disclosure describes a system and method for providing online calibration of a plurality of cameras in a surround-view camera system on a vehicle. The method provides consecutive images from each of the cameras in the surround-view system and identifies overlap image areas for adjacent cameras. The method identifies matching feature points in the overlap areas of the images and estimates camera parameters in world coordinates for each of the cameras. The method then estimates a vehicle pose of the vehicle in world coordinates and calculates the camera parameters in vehicle coordinates using the estimated camera parameters in the world coordinates and the estimated vehicle pose to provide the calibration.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing online calibration of cameras in a surround-view camera system on a vehicle is merely exemplary in nature, and is in no way intended to limit the invention or its applications or uses. For example, as discussed, the system and method has particular application for providing online calibration of cameras on a vehicle. However, as will be appreciated by those skilled in the art, the system and method may have application for other mobile platforms, such as on trains, machines, tractors, boats, recreation vehicles, etc.

Figure 1:
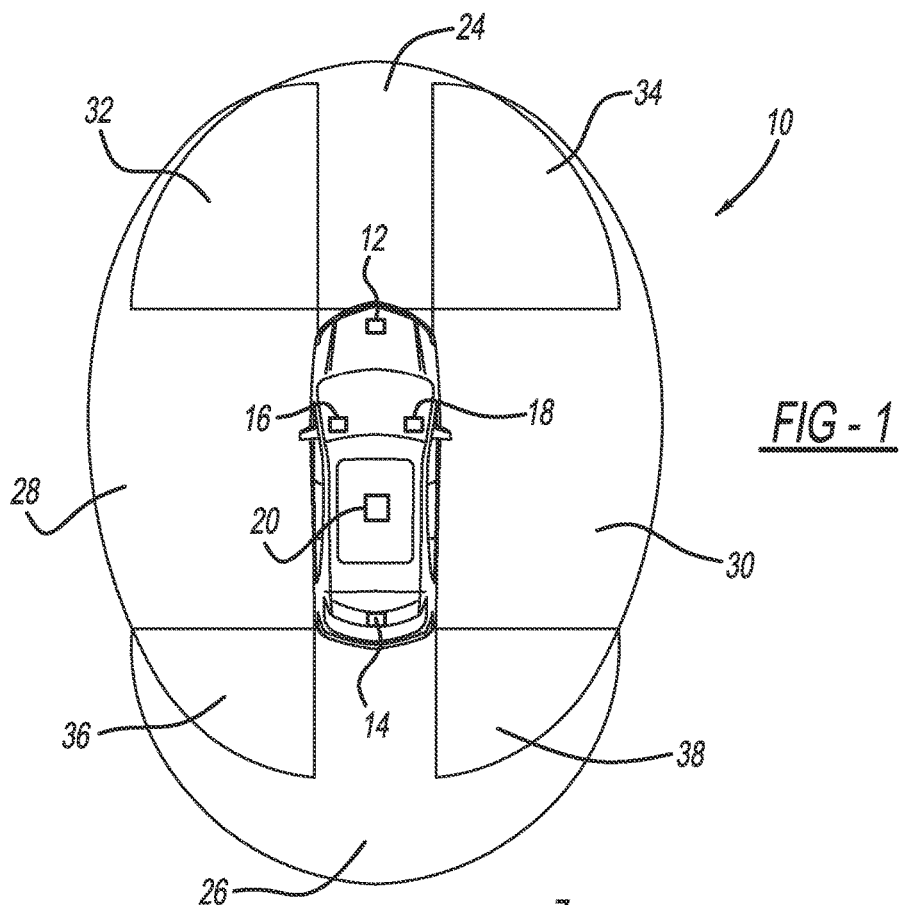
FIG. 1 is an illustration of a vehicle including a surround-view camera system having multiple cameras.

FIG. 1 is a top illustration of a vehicle 10 including a surround-view camera system having a front-view camera 12, a rear-view camera 14, a left-side driver view camera 16 and a right-side passenger view camera 18. The cameras 12-18 can be any camera suitable for the purposes described herein, many of which are known in the automotive art, that are capable of receiving light, or other radiation, and converting the light energy to electrical signals in a pixel format using, for example, charged coupled devices (CCD). The cameras 12-18 generate frames of image data at a certain data frame rate that can be stored for subsequent image processing in a video processing module (VPM) 20. The cameras 12-18 can be mounted within or on any suitable structure that is part of the vehicle 10, such as bumpers, facie, grill, side-view mirrors, door panels, etc., as would be well understood and appreciated by those skilled in the art. In one non-limiting embodiment, the side cameras 16 and 18 are mounted under the side view mirrors and are pointed downwards.

The cameras 12-18 generate images of certain limited areas around the vehicle 10 that partially overlap. Particularly, area 24 is the image area for the camera 12, area 26 is the image area for the camera 14, area 28 is the image area for the camera 16, and area 30 is the image area for the camera 18, where area 32 is an overlap area of the images 24 and 28, area 34 is an overlap area of the images 24 and 30, area 36 is an overlap area of the images 28 and 26, and area 38 is an overlap area of the images 30 and 26. Image data from the cameras 12-18 is sent to the VPM 20 that processes the image data to stitch the images together that can then be displayed on a vehicle display as a single top-down view image around the vehicle 10.

Figure 2:
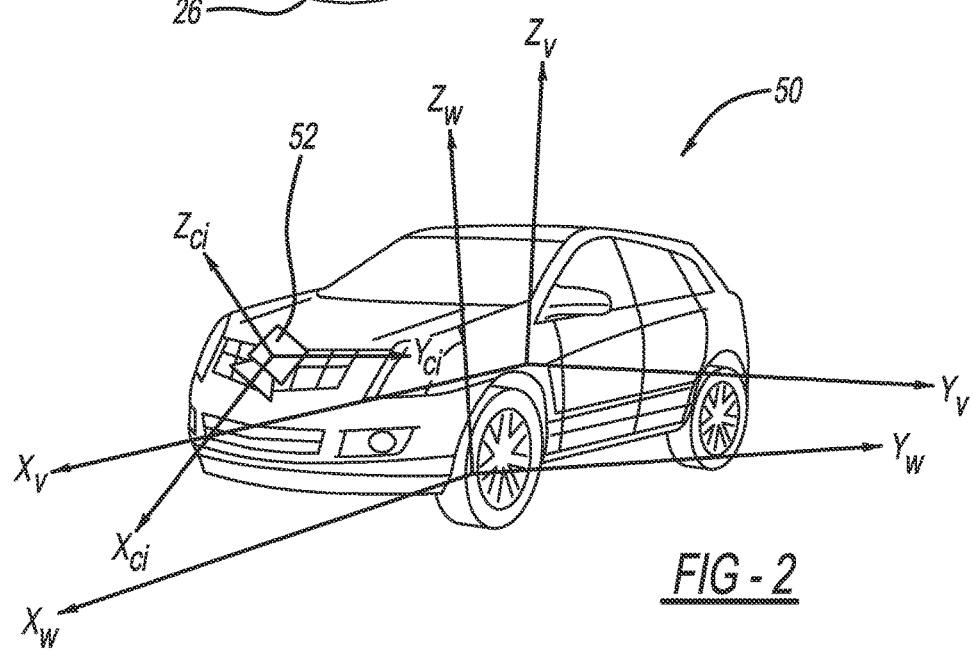
FIG. 2 is an isometric view of a vehicle showing a coordinate system for world coordinates, vehicle coordinates and camera coordinates.

As will be discussed in detail below, the present invention proposes an online calibration technique for calibrating the cameras 12-18 while the vehicle 10 is being operated. Software algorithms are known that employ rotation matrices R and transition vectors t to orient and reconfigure the images from adjacent cameras so that the images properly overlap. Generally, the proposed calibration technique defines three coordinate systems, namely, a world coordinate system, a vehicle coordinate system and a camera coordinate system each defined in an X-Y-Z positional orientation. FIG. 2 is an illustration of a vehicle 50 including a camera 52 showing these coordinates systems, where the subscript V represents the vehicle coordinates, the subscript W represents the world coordinates and the subscript C represents the camera coordinates, and where i represents the particular camera of the four cameras in the surround-view system.

As will be discussed, the calibration technique finds matching feature points (u,v) in the overlap areas 32, 34, 36 and 38 for two camera images, and based on the matching feature points (u,v) uses a transformation process to estimate camera parameters in world coordinates, vehicle pose, i.e., heading and offset, in world coordinates, and from there camera parameters in vehicle coordinates. Each feature point (u,v) is a representation of a particular pixel location in one image from a particular camera for a point X in an overlap region in the particular coordinate system. The calibration algorithm then provides feedback validation and tracking refinement.

For a particular point X in the overlap region the algorithm identifies a relationship between that point in the world coordinate system to the vehicle coordinate system, and then from the vehicle coordinate system to the camera coordinate system as shown and defined by equations (1)-(3) below, where R is a 3×3 rotation matrix identifying roll, pitch and yaw, and includes nine values that define the pitch, yaw and roll of the coordinate system, and where, for example, $R_{V2Ci}$ identifies the camera pose, and t is a 1×3 translation vector identifying the X, Y, Z position in the particular coordinate system. More particularly, equation (1) shows how point X in world coordinates is translated into vehicle coordinates, and equation (2) shows how point X in vehicle coordinates is translated into camera coordinates.

$$X_V = R_{orient} * X_W + t'_{W2V},\qquad(1)$$

$$X_{Ci} = R_{V2Ci} * X_V + t'_{V2Ci},\qquad(2)$$

$$= R_{V2Ci} * R_{orient} * X_W + t'_{W2Ci}.\qquad(3)$$

Figure 3:
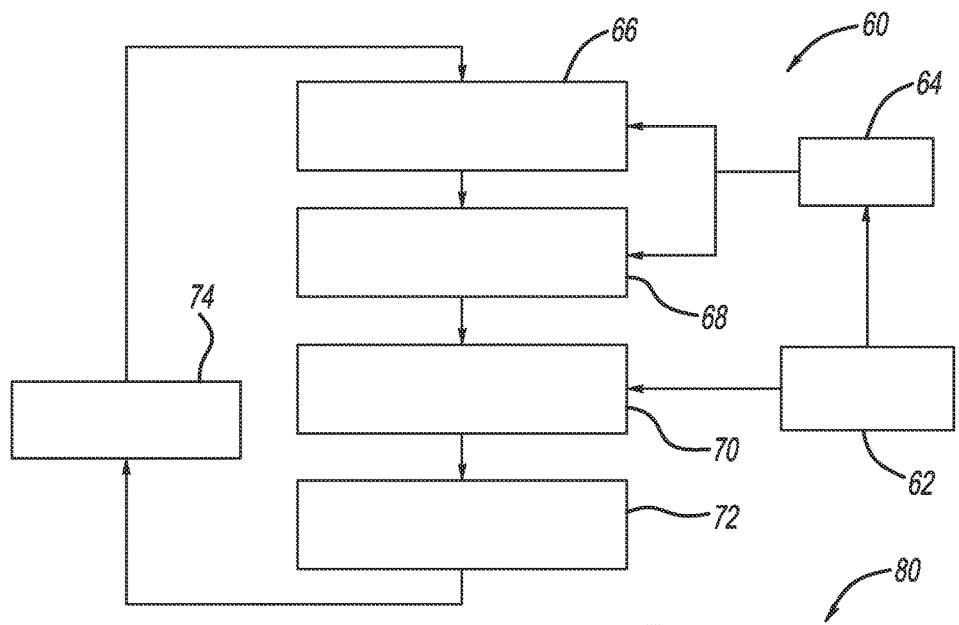
FIG. 3 is a flow chart diagram showing a process for providing online surround-view camera calibration.

FIG. 3 is a flow chart diagram 60 showing a process for providing online camera calibration in the VPM 20, where the vehicle parameters of vehicle speed and vehicle yaw rate are provided box 62. The previous frames of images from all of the cameras 12-18 are provided at box 64 that receives the vehicle parameters from the box 62. These frames of images are provided to box 66 that identifies the matching feature points (u,v) and patterns in the overlap areas 32, 34, 36 and 38, as discussed below.

Figure 4:
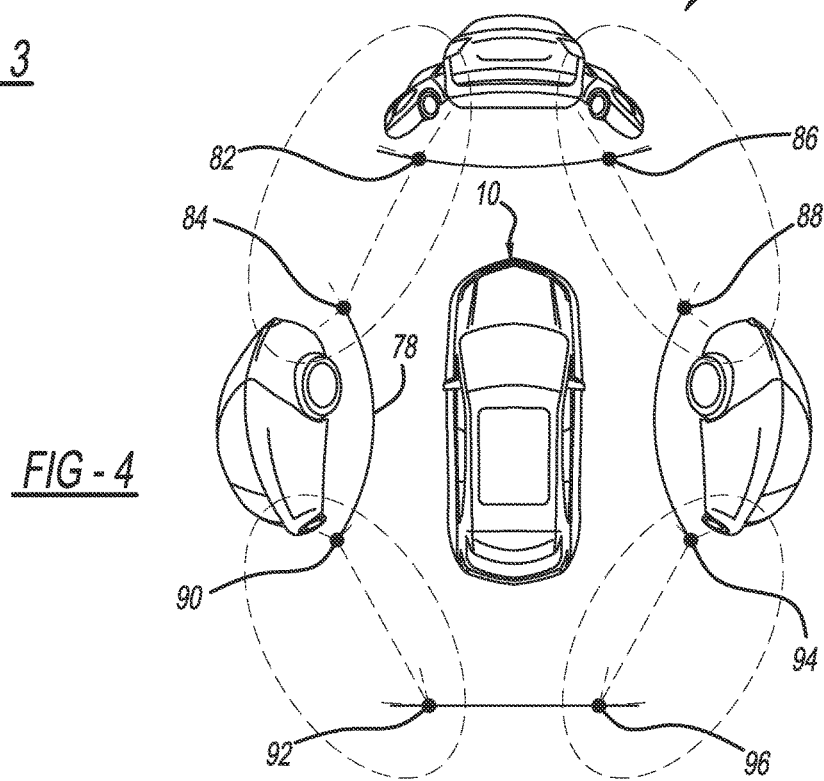
FIG. 4 is a representation of four raw images from four cameras for the surround-view camera system showing matched feature pairs.

FIG. 4 is an illustration 80 of the vehicle 10 in a parking lot adjacent to other vehicles, where parking lot lines 78 can be used to identify matching feature points (u,v) in two overlapping camera images. The matching feature points (u,v) do not have to be on the ground, but can be on any suitable object above ground or otherwise, such as on the vehicle body. Points 82 and 84 represent the same point in the overlap area 32 for the images provided by the front camera 12 and the left-side camera 16, respectively. Points 86 and 88 represent the same point in the overlap area 34 for the images from the camera 12 and the right-side camera 18, respectively. Points 90 and 92 represent the same point in the overlap area 36 between the left-side camera 16 and the rear camera 14, respectively. Points 94 and 96 represent the same points in the overlap area 38 between the right side camera 18 and the rear camera 14, respectively.

Figure 5:
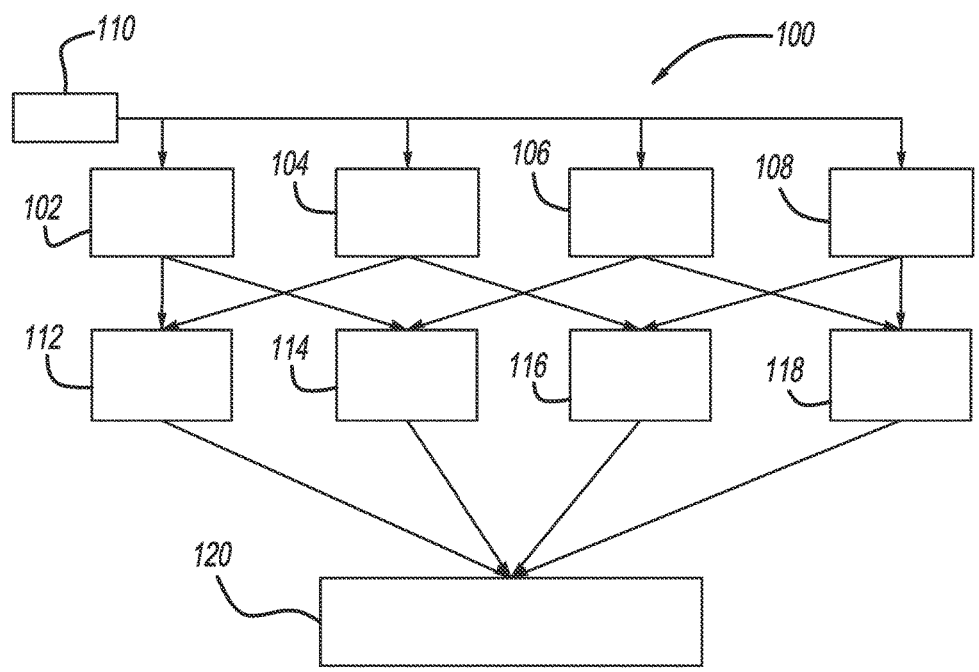
FIG. 5 is a block diagram of a system showing a process for matching feature points.

FIG. 5 is a block diagram of a system 100 showing a general representation of the process for how the online calibration algorithm identifies matching feature points (u,v) in the overlap areas 32, 34, 36 and 38 at the box 66. In the system 100, box 102 represents the image from the front camera 12, box 104 represents the image from the left-side camera 16, box 106 represents the image from the right-side camera 18, and box 108 represents the image from the rear camera 14. A synchronization block 110 synchronizes the timing of the images 102-108 from the cameras 12-18 so that all of the images 32, 34, 36 and 38 are aligned in time before being aligned in space from the calibration process. The images 102 and 104 from the cameras 12 and 16, respectively, generate a region of interest 112 in the overlap area 32, the images 102 and 106 from the cameras 12 and 18, respectively, generate a region of interest 114 in the overlap area 34, the images 104 and 108 from the cameras 16 and 14, respectively, generate a region of interest 116 in the overlap area 36, and the images 106 and 108 from the cameras 14 and 18, respectively, generate a region of interest 118 in the overlap area 38. The regions of interest 112, 114, 116 and 118 are then provided to a processor 120 that identifies the several matching feature points (u,v) in the regions of interest 112, 114, 116 and 118. Those skilled in the art will understand that many computer vision and imaging systems employ feature point detection and matching techniques and algorithms, such as SIFT, SURF, ORB, etc., that may be applicable for the purposes discussed herein.

Once the matching feature points (u,v) have been identified above, the algorithm uses the matching feature points (u,v) in adjacent images to estimate the camera parameters in world coordinates at box 68 of FIG. 3 using equation (4) below, where $X_C$ identifies a pixel in the particular overlap image in camera coordinates, using the previous frames of image data from the box 64. The matching feature points (u,v) in two images in the overlap area will be spatially close as shown by equation (5). Also, a particular matching feature point from two cameras will coincide with a particular point in world coordinates as shown in equations (6) and (7) below.

$$X_C = R_{w2C} * X_W * t'_{w2C},\quad (4)$$

$$(u,v)_{ci} \sim (u,v)_{cj},\quad (5)$$

$$(u,v)_{ci} \to X_{Ci},\quad (6)$$

$$(u,v)_{cj} \to X_{Cj},\quad (7)$$

where ci and cj identify two particular cameras.

The algorithm determines matching feature points (u,v) in camera coordinates for both cameras that matches the same world pixel point $X_w$ as:

$$X_{Ci} = R_{W2Ci} * X_W + t'_{W2Ci},\quad (8)$$

$$X_{Cj} = R_{W2Cj} * X_W + t'_{W2Cj},\quad (9)$$

From equations (8) and (9), that can be expanded to show the full matrix, the algorithm determines N matching feature points (u,v). When taking all four cameras into consideration, the solution of equations (8) and (9) for four cameras will be N world coordinate points seen in the overlap regions, which provides 6×4 unknown camera calibration parameters ($\alpha$, $\beta$, $\gamma$, $x_c$, $y_c$, $z_c$) and 3×N unknown world coordinate point values ($x_i$, $y_i$, $z_i$). Since these N world coordinate point values are in the overlapped areas of two of the cameras, each point will show in two images with known pixel locations ($u_i^{c-j}$, $v_i^{c-j}$). Thus, there are 2×2×N equations to connect these 6×4+3×N unknown parameters with the 2×2×N known pixel locations. If the VPM 20 is able to detect at least 24 matching feature points in the overlap areas, equations (8) and (9) can be solved to estimate the calibration parameters. These 24 matching feature points can be either from a single frame (e.g. a complex scene in urban environment having a lot of feature points) or from multiple frames. There is no problem to use multiple frames because the camera parameters are not time-varying.

Using the estimated camera parameters in the world coordinates, the algorithm then estimates the pose, i.e., the heading and offset, of the vehicle 10 in world coordinates at box 70 in FIG. 3 using equation (10) below so that the algorithm knows the relative rotation (orientation/yaw) and shift (lateral offset) of vehicle coordinates to world coordinates.

$$X_V = R_{orient} * X_W + t'_{W2V}\quad (10)$$

Equation (10) has two unknowns, namely orientation and lateral offset.

Figure 6:
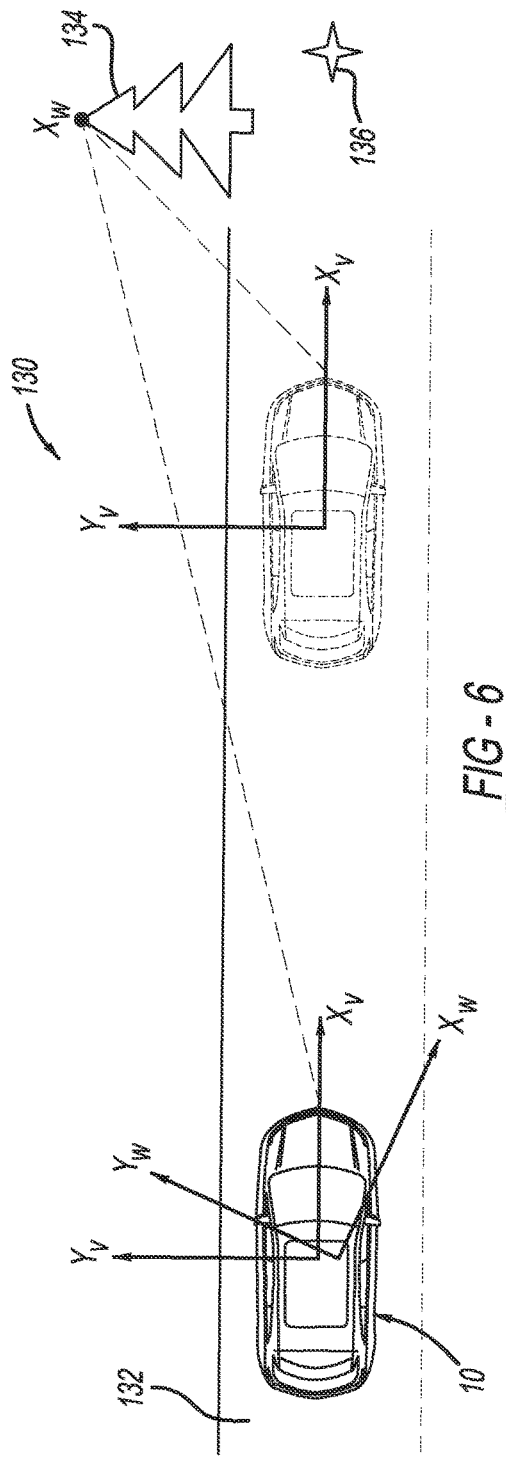
FIG. 6 is an illustration of a vehicle on a roadway and showing a process for determining vehicle pose.

The algorithm can employ any suitable vehicle heading angle estimation process for the purposes discussed herein. FIG. 6 is an illustration 130 of the vehicle 10 traveling on a roadway 132 showing the vehicle 10 at two different positions. In a first technique, a static object that is in front and along the side or behind and along the side the vehicle 10, such as a tree 134, at a distance from the vehicle 10 is identified to provide an object whose lateral position in vehicle coordinates does not change when the vehicle 10 is traveling straight. One of the cameras 12-18 tracks a feature point, which is a projection of a world point location $X_W$ on the tree 134 along a constant Y-position in vehicle coordinates, particularly, the lateral offset of the vehicle 10. Since the lateral offset of the vehicle 10 does not change, the Y-position of the vehicle 10 is constant, and thus, the algorithm knows the vehicle heading angle by calculating the detected feature point position change in world coordinates as $\Theta = a\tan((y_{w2}-y_{w1})/(x_{w2}-x_{w1}))$. If there is a change in the Y-position of the vehicle 10 above a predetermined threshold relative to the point $X_W$, then the algorithm knows that the heading angle of the vehicle 10 has changed and can correct the calibration calculations accordingly.

In a second technique, the algorithm employs the front camera 12 and the rear camera 14 to calculate an optical flow of the vehicle 10 by detecting a vanishing point 136 in front of the vehicle 10 having a zero flow that is able to be used to estimate the heading angle of the vehicle 10. The vanishing point 136 detected in the images from the front camera 12 and the rear camera 14 can be used to calculate the mounting orientation of the cameras 12 and 14 in vehicle coordinates by subtracting the camera mounting orientation angle in world coordinates, determined as above, to get the vehicle heading angle.

In a third technique, the algorithm uses vehicle body reference points or lines from, for example, the side cameras 16 and 18, to see components on the vehicle 10, such as the front or rear wheels, body frame lines, vehicle bumpers, to give vehicle body reference points that can be used for vehicle heading and offset estimation.

At box 72 in FIG. 3, the algorithm calculates the camera extrinsic parameters in vehicle coordinates using the relationship:

$$X_c = R_{V2C} * X_V + t'_{V2C}.\quad (11)$$

The algorithm uses the estimations of the camera parameters in world coordinates and the vehicle pose as discussed above to calculate the camera extrinsic parameters in vehicle coordinates to provide the online camera calibration using equations (12)-(15) below.

$$X_V = R_{orient} * X_W + t'_{W2V},\quad(12)$$

$$X_{Ci} = R_{V2Ci} * X_V + t'_{V2Ci},\quad(13)$$

$$= R_{V2Ci} * R_{orient} * X_W + t'_{W2Ci},\quad(14)$$

$$= R_{W2Ci} * X_W + t'_{W2Ci}.\quad(15)$$

From equations (12)-(15), the rotation matrix $R_{V2Ci}$ for the pose of the particular camera i, i.e., pitch, yaw and roll, in camera coordinates, and the translation vector $t'_{V2Ci}$ of the position of camera i in camera coordinates x, y and z can be determined.

Figure 7:
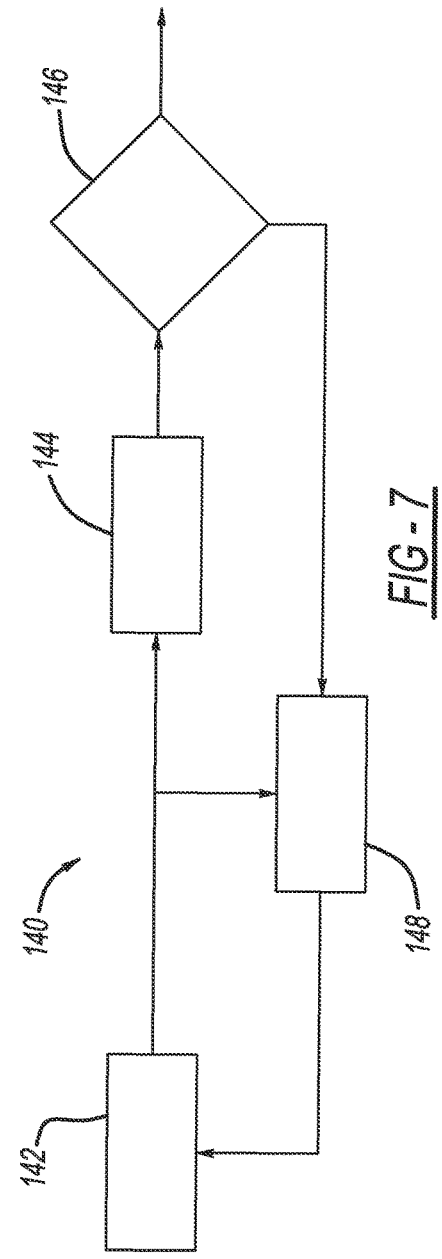
FIG. 7 is a flow chart diagram showing a process for calibration validation and refinement.

At box 74 in FIG. 3, the algorithm provides validation, tracking and refinement through feedback of the online camera calibration. FIG. 7 is a flow chart diagram 140 showing such feedback validation and refinement for the algorithm. The validation process validates the calibration estimation for both straight and smooth driving to verify that the points in the overlapped images from the cameras 12-18 are aligned. The process includes performing the online calibration at box 142 in the manner discussed above to calibrate the orientation of the cameras 12-18, and then provides lane-sensing at box 144 to identify detected lane markers from the cameras 12-18 to determine if they align with each other in the overlap image areas after the calibration process has been performed. The algorithm determines, at decision diamond 146, if there is alignment within a predetermined threshold, and if not, notifies a feedback box 148 to provide temporal smoothing and feedback refinement, where the calibration parameters are not time-varying so that refinement of the calibration can be achieved by temporal smoothing. The temporal smoothing and refinement of the online calibration from the box 142 is then instructed to be performed at the box 148, which provides an updated calibration to the calibration process at the box 142.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing online calibration of a plurality of cameras in a surround-view camera system on a vehicle, said method comprising:
providing consecutive images from each of the cameras in the surround-view camera system where an image from a forward looking camera overlaps an image from a right looking camera, an image from the forwarding looking camera overlaps an image from a left looking camera, an image from a rear looking camera overlaps an image from the right looking camera and an image from the rear looking camera overlaps an image from the left looking camera;
identifying matching feature points in overlap areas of the images from the forward looking camera, the left looking camera, the right looking camera and the rear looking camera;
estimating camera parameters in world coordinates for each of the cameras;
estimating a vehicle pose of the vehicle in world coordinates, including monitoring vehicle body reference points and lines on the vehicle in images from the cameras to determine vehicle heading and lateral offset; and
determining camera extrinsic parameters in vehicle coordinates using the estimated camera parameters in the world coordinates and the estimated vehicle pose in the world coordinates where the camera extrinsic parameters define an online calibration of the particular camera.

2. The method according to claim 1 wherein estimating camera parameters in world coordinates includes defining a rotation matrix and a translation vector for each camera.

3. The method according to claim 2 wherein the rotation matrix defines pitch, roll and yaw of each camera in world coordinates.

4. The method according to claim 1 wherein estimating a vehicle pose includes using inputs of vehicle speed and vehicle yaw rate to determine whether the vehicle is driving straight.

5. The method according to claim 1 wherein estimating a vehicle pose includes tracking a point on a fixed reference object a significant distance in front and along the side or behind and along the side of the vehicle.

6. The method according to claim 1 wherein estimating a vehicle pose includes calculating an optical flow of an image relative to a vanishing point in front of or behind the vehicle.

7. The method according to claim 1 further comprising providing validation, tracking and refinement processes for the online calibration of the cameras.

8. The method according to claim 7 wherein the validation process validates the calibration estimation for both straight and smooth vehicle driving to verify that the matching feature points in the overlapped images from the cameras are aligned.

9. A method for providing online calibration of a plurality of cameras mounted on a mobile platform, said method comprising:
providing consecutive images from each of the cameras where images from adjacent cameras overlap defining an overlap area;
identifying matching feature points in the overlap area;
estimating camera parameters in world coordinates for each of the cameras;
estimating a pose of the platform in world coordinates, including monitoring reference points and lines on the platform in images from the cameras to determine platform heading and lateral offset; and
determining camera extrinsic parameters in platform coordinates using the estimated camera parameters in the world coordinates and the estimated platform pose in the world coordinates where the camera extrinsic parameters define an online calibration of the particular camera.

10. The method according to claim 9 wherein estimating camera parameters in world coordinates includes defining a rotation matrix and a translation vector for each camera.

11. The method according to claim 10 wherein the rotation matrix defines pitch, roll and yaw of the platform of each camera in world coordinates.

12. The method according to claim 9 wherein estimating a structure pose includes using inputs of platform speed and platform yaw rate to determine whether the platform is moving straight.

13. A system for providing online calibration of a plurality of cameras in a surround-view camera system on a vehicle, said system comprising:

means for providing consecutive images from each of the cameras in the surround-view camera system where an image from a forward looking camera overlaps an image from a right looking camera, an image from the forwarding looking camera overlaps an image from a left looking camera, an image from a rear looking camera overlaps an image from the right looking camera and an image from the rear looking camera overlaps an image from the left looking camera;

means for identifying matching feature points in overlap areas of the images from the forward looking camera, the left looking camera, the right looking camera and the rear looking camera;

means for estimating camera parameters in world coordinates for each of the cameras;

means for estimating a vehicle pose of the vehicle in world coordinates, including means for monitoring vehicle body reference points and lines on the vehicle in images from the cameras to determine vehicle heading and lateral offset; and means for determining camera extrinsic parameters in vehicle coordinates using the estimated camera parameters in the world coordinates and the estimated vehicle pose in the world coordinates where the camera extrinsic parameters define an online calibration of the particular camera.

14. The system according to claim 13 wherein the means for estimating camera parameters in world coordinates defines a rotation matrix and a translation vector for each camera.

15. The system according to claim 14 wherein the rotation matrix defines pitch, roll and yaw of each camera in world coordinates.

16. The system according to claim 13 wherein the means for estimating a vehicle pose includes using inputs of vehicle speed and vehicle yaw rate to determine whether the vehicle is driving straight.

17. The system according to claim 13 further comprising means for providing validation, tracking and refinement processes for the online calibration of the cameras.

18. The system according to claim 17 wherein the means for providing a validation process validates the calibration estimation for both straight and smooth vehicle driving to verify that the matching feature points in the overlapped images from the cameras are aligned.

* * * * *